May 18, 1943     E. H. KRUSE     2,319,462
LINE GUIDE FOR FISHING POLES
Filed Sept. 5, 1942
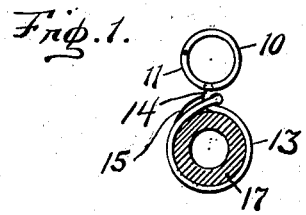
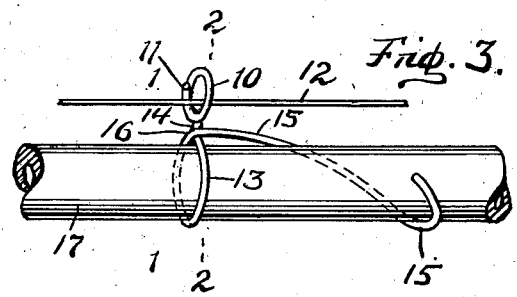
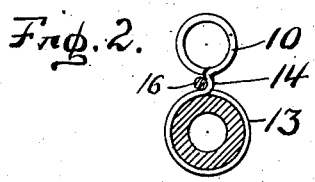
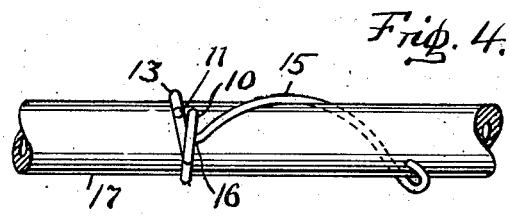
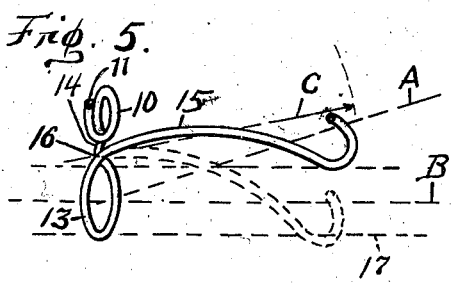
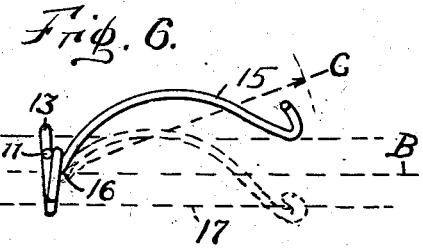
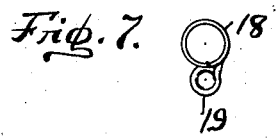
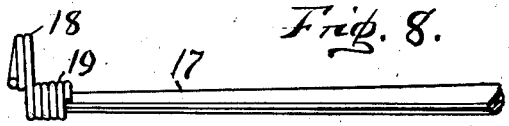
Edward H. Kruse
INVENTOR
BY
H. G. Burns ATTORNEY Patented May 18, 1943

2,319,462

UNITED STATES PATENT OFFICE 2,319,462

LINE GUIDE FOR FISHING POLES

Edward H. Kruse, Fort Wayne, Ind.

Application February 5, 1942, Serial No. 429,670

6 Claims. (Cl. 43—24)

This invention relates to improvements in line guides for fishing poles, an object thereof being the provision of a readily attachable and detachable line guide capable of being securely positioned at any suitable location on a fishing pole without use of an adjunct that is ordinarily resorted to in fastening a line guide to a pole.

Another object of the invention is to so form a line guide structure that when applied to a pole it inherently clasps itself on the pole firmly and thus is retained in a definite selected position thereon.

And a further object of the invention is to provide a line guide structure for a fishing pole, preferably formed of a single piece of spring wire shaped with a portion thereof to entirely encircle the pole and another portion that partially encircles the pole when the structure is in place thereon and causes binding of the other portion around the pole thus to prevent both axial and angular relative movement between the guide structure and the pole.

Other objects and advantages of the invention appear in the following description.

An illustrative embodiment of the invention is shown in the accompanying drawing, in which:

Fig. 1 is a front elevational view of a line guide structure, in which the invention is incorporated, mounted upon a pole which is shown in section on the line 1—1 of Fig. 3;

Fig. 2 is a rear elevational view of the line guide structure including the pole, the section being on the line 2—2 of Fig. 3;

Fig. 3 is a side elevational view of the line guide structure mounted upon a fragmentary section of a fishing pole;

Fig. 4 is a top plan view projected from Fig. 3;

Fig. 5 is a side elevational view of the line guide structure as it appears in its normal form prior to being applied to the pole and showing also in dotted outline its form after having been applied to the pole;

Fig. 6 is a top plan view of the structure shown in Fig. 5;

Fig. 7 is a front end elevation of a line guide of different form mounted on the extreme tip end of a fishing pole; and Fig. 8 is a fragmentary side elevational view projected from Fig. 7.

The illustrative embodiment of the invention consists of a line guide formed preferably of a single piece of spring wire of a suitable length as is required to entirely complete the structure, shaped to have an end coil 10 that terminates with an overlapping portion 11, the coil constituting an eye through which the fish line 12 is strung for guidance therein, a medial portion being looped to form a choke ring 13, an intermediate portion between the ring and eye being bent to form a saddle 14, and the opposite end portion of the wire being shaped spirally to form a tail lever 15 that is a continuation of the looped portion 13, there being a bend 16 made in the wire, at the juncture of the choke ring and the tail lever, that snugly fits into the saddle 14.

The spiral tail lever 15 is initially coiled about an axis A that intersects the center of the choke ring 13 and extends divergently upward and laterally outward with respect to the pole 17 upon first placing the ring thereon. Subsequently, upon springing the tail lever upon the radius C, which is centered in the bend 16, downwardly and laterally inward around under the pole, the coil of the lever partially encompasses the pole, the choke ring is constricted and the axis A of the tail lever then assumes alinement with the axis B of the pole. In this manner the line guide structure is clasped firmly in place so that angular as well as axial displacement from a selected position on the pole is prevented.

The line guide fixture shown in Figs. 7 and 8 preferably is formed of a single piece of spring wire one end portion of which is shaped to provide a coil 18 with overlapping turns and constitutes an eye through which the fishing line is strung and has guidance therein. The other end portion of the wire is shaped to provide an anchor coil 19 which is screwed tightly onto the tip of the pole. Preferably, the axes of the eye and the anchor coil are in parallel planes spaced apart from each other, and the eye is disposed in a transverse plane respecting the axes forwardly beyond the anchor coil to thereby circumvent entanglement of the fishing line with the anchor coil or interference by the tip of the pole.

The fishing line 12 is strung into the several guide eyes by drawing it in between the overlapping terminals 11 and corresponding adjacent coils whereupon the line passes through the eye openings and then has free running movement therethrough.

In use, the guides are firmly secured upon the pole at suitably spaced intervals especially throughout the limber portion of the pole, and with the eyes of the guides in normal axial alinement with each other. In this manner the bending strain imposed upon the pole by the line, as when a catch is being made, or upon the bait becoming entangled with an obstruction, is more or less uniformly distributed so that breaking of the pole is averted.

Variations from the particular construction above disclosed may be resorted to by the exercise of skill in the art, without departure from the spirit or scope of the invention, and the following claims are intended to be inclusive of such variations.

What I claim is:

1. A line guide for a fishing pole made of a single piece of spring wire one end portion of which is shaped to have a coil with an overlapping terminal constituting an eye for guidance of a fishing line, a medial portion forming a choke ring to completely encircle said pole, an intermedial portion between the eye and ring formed to provide a saddle, and a spiral opposite end portion constituting a tail lever to partially encircle said pole, said lever having a bend at its juncture with the ring that fits into said saddle.

2. A line guide for a fishing pole having a coil with an overlapping end terminal constituting an eye, a saddle adjacent the opposite end of said coil, a choke ring contiguous at one end thereof with said saddle, and a spiral tail contiguous with the other end of the ring provided with a bend at its juncture therewith that fits into said saddle, the structure being such that upon insertion of a pole through said ring and springing the tail into place, the ring is thereby constricted around said pole thus to secure the structure in a selected position thereon.

3. A line guide fixture attachable to a fishing pole having an eye, a saddle contiguous with said eye, a choke ring contiguous at one end with said saddle, and a spiral tail contiguous with the other end of said ring, said tail being shaped to cross and bear in said saddle at its juncture with said ring, so that when the fixture is secured in place on a pole the ring is constricted and the tail gripped around said pole.

4. A guide line fixture as defined in claim 3, said tail being initially disposed about an axis that is divergent through the center of said ring and when said tail is sprung into place said axis is then alined with the axis of said pole.

5. A line guide fixture for a fishing pole made of spring metal shaped to provide a guide eye, a choke ring having a connection at one end thereof with and supporting said eye, and a tail lever contiguous with the other end of said ring and having a bend at its juncture therewith that extends across and partially around said connection so that when the fixture is secured to a pole the ring is constricted and the lever gripped firmly around said pole.

6. A line guide fixture for a fishing pole provided with an eye, a choke ring having at one end thereof a connection with said eye, and a spirally formed spring tail the proximal part of which is contiguous with the other end of said ring and having a bend at its juncture therewith that bears against said connection, so that when a pole is encircled by the ring and the tail is manipulated upon radii centered in said bend the ring is constricted and the tail gripped about said pole.

EDWARD H. KRUSE.